United States Patent [19]

Soto

[11] Patent Number: 5,225,821
[45] Date of Patent: Jul. 6, 1993

[54] METHOD FOR DRIVING AN ACTIVE MATRIX DISPLAY AND ACTIVE MATRIX DISPLAY

[75] Inventor: Takashi Soto, Suwa, Japan

[73] Assignee: Seiko Epson Corporation, Tokyo, Japan

[21] Appl. No.: 588,124

[22] Filed: Sep. 25, 1990

Related U.S. Application Data

[63] Continuation-in-part of Ser. No. 288,312, Dec. 22, 1988, abandoned.

[30] Foreign Application Priority Data

Sep. 26, 1989 [JP] Japan .................. 1-250082

[51] Int. Cl.⁵ .............................. G09G 3/36
[52] U.S. Cl. ............................ 340/784; 359/54
[58] Field of Search .......... 350/333, 334, 336, 339 R, 350/350 S; 340/784, 765, 805; 359/54, 55, 56

[56] References Cited

U.S. PATENT DOCUMENTS

| | | | |
|---|---|---|---|
| 3,725,899 | 4/1973 | Greubel | 340/324 |
| 4,021,798 | 5/1977 | Kojima et al. | 340/324 |
| 4,040,720 | 8/1977 | York | 350/160 |
| 4,051,465 | 9/1977 | Brody | 340/173.2 |
| 4,572,615 | 2/1986 | Nickol et al. | 350/334 |
| 4,630,893 | 12/1986 | Credelle et al. | 350/334 |
| 4,725,109 | 2/1988 | Kondo et al. | 350/333 |
| 4,790,631 | 12/1988 | Yamazaki | 350/336 |
| 4,840,462 | 6/1989 | Hartman | 350/350 |
| 4,850,680 | 6/1989 | Yamazaki et al. | 350/340 |
| 4,944,575 | 7/1990 | Aigrain et al. | 350/333 |
| 4,978,203 | 12/1990 | Yamazaki et al. | 350/339 |
| 4,995,706 | 2/1991 | Inujima et al. | 350/350 S |

FOREIGN PATENT DOCUMENTS

| | | | |
|---|---|---|---|
| 0246945 | 11/1987 | European Pat. Off. | 1/135 |
| 0248471 | 12/1987 | European Pat. Off. | 3/36 |
| 0320054 | 6/1989 | European Pat. Off. | 3/36 |
| 0321962 | 6/1989 | European Pat. Off. | 1/133 |
| 0155795 | 8/1979 | Japan | 350/339 R |
| 279392 | 5/1987 | Japan . | |

OTHER PUBLICATIONS

G. Grabmaier, et al. Liquid Crystal Matrix Displays Using Additional Solid Layers for Suppression of Parasite Currents, Molecule Crystals and Liquid Crystals, vol. 15, 1971, pp. 95–104.

L. E. Tannas, et al., Matrix Addressed Liquid Crystal Ferroelectric Display, SID 73, May 15, 1973, p. 178.

D. E. Castleberry, Control Layers for Liquid Crystal Matrix Dislays; 198 Biennial Display Research Conference, Oct. 1990.

*Primary Examiner*—Ulysses Weldon
*Assistant Examiner*—Doon Yue Chow
*Attorney, Agent, or Firm*—Blum Kaplan

[57] ABSTRACT

A method for driving an active matrix electro-optical display having pixel electrodes arranged in a matrix with a plurality of first electrodes arranged in rows, through an active ferroelectric layer disposed between the first electrode and the pixel electrode is provided. A second electrode is disposed in a row direction on an opposed substrate with an electro-optical material in the space between the substrates. The method includes the steps of applying a selective voltage $V_0$ to the first electrode and a data voltage $V_1$ to the line electrode so that the range of the absolute value $|V_1|$ of the data voltage $V_1$ is represented by $|V_1| < E_c \cdot d_F(C_{LC}+C_F)/C_{LC}$ in which $E_c$ is defined as the electric field of the active layer, $d_F$ is defined as the thickness of the active layer, $C_F$ is defined as the capacitance of the picture element of the active layer and $C_{LC}$ is defined as the capacitance of the electro-optical material.

37 Claims, 13 Drawing Sheets

FIG. II

METHOD FOR DRIVING AN ACTIVE MATRIX DISPLAY AND ACTIVE MATRIX DISPLAY

CROSS-REFERENCE TO RELATED APPLICATION

This application is a continuation-in-part application of U.S. patent application Ser. No. 07/288,312, now abandoned, filed Dec. 22, 1988.

BACKGROUND OF THE INVENTION

This invention relates to liquid crystal display devices, and in particular, to a method for driving a liquid crystal display device including an active matrix substrate having a ferroelectric material as an active layer.

A typical liquid crystal display device includes an active matrix display in which a voltage is applied to a material having an electro-optical effect, such as a liquid crystal material. A matrix display using the remanent polarization of a ferroelectric material to form the active layer of the active matrix display is set forth in Japanese Patent Laid - Open No. 62-279392. To drive the active matrix display, a writing-in step is required to invert the remanent polarization in the selective period and to hold the remanent polarization inverted in the holding period to avoid the inversion of the spontaneous polarization.

In a conventional liquid crystal display, the remanent polarization in the holding period is inverted. Therefore, variation of the remanent polarization value cannot be avoided and cross-talk is generated in the liquid crystal material causing a degradation of display quality.

Accordingly, it is desirable to provide a method for driving an active matrix display including a ferroelectric material as the active layer while realizing excellent display quality without cross-talk.

SUMMARY OF THE INVENTION

Generally speaking, in accordance with the invention, an active matrix display and a method for driving the active matrix electro-optical display device including an active layer of ferroelectric material wherein a selective voltage $V_0$ is applied to a first electrode and a data voltage $V_1$ is applied to a line electrode so that the range of the absolute value of $|V_1|$ of the data voltage is represented by $$|V_1| \angle E_c \cdot d_F (C_{LC} + C_F)/C_{LC}$$

in which $E_c$ is the electric field of the ferroelectric layer, $d_F$ is the thickness of the active ferroelectric layer, $C_F$ is the capacitance of the picture element of the active ferroelectric layer and $C_{LC}$ is the capacitance of the liquid crystal material is provided.

A matrix of first electrodes are arranged in columns on the first insulating substrate with a matrix of picture element electrodes electrically coupled to the first electrodes are arranged in columns and rows on the first substrate. A second cooperating insulating substrate with a plurality of parallel line electrodes are deposited on the second insulating substrate. An electro-optical material, such as a liquid crystal material is placed in the space between the first and second insulating substrates.

Accordingly, it is an object of the invention to provide an improved method for driving an electro-optical active matrix display device.

Another object of the invention is to provide an improved method for driving an active matrix display device without crosstalk.

A further object of the invention is to provide an improved electro-optical display device generating improved display quality.

Yet another object of the invention is to provide a method for driving an active matrix display using a ferroelectric active element so that the writing-in step may occur by inverting the remanent polarization in the selective period and to hold the remanent polarization inverted in the holding period to avoid its inversion.

Still other objects and advantages of the invention will in part be obvious and will in part be apparent from the specification.

The invention accordingly comprises the several steps and the relation of one or more of such steps with respect to each of the others, and the apparatus embodying features of construction, combination(s) of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a plan view of a portion of an active matrix display prepared in accordance with the invention;

DETAILED DESCRIPTION OF THE PREFERRED EMBODIMENTS

Figure 1:
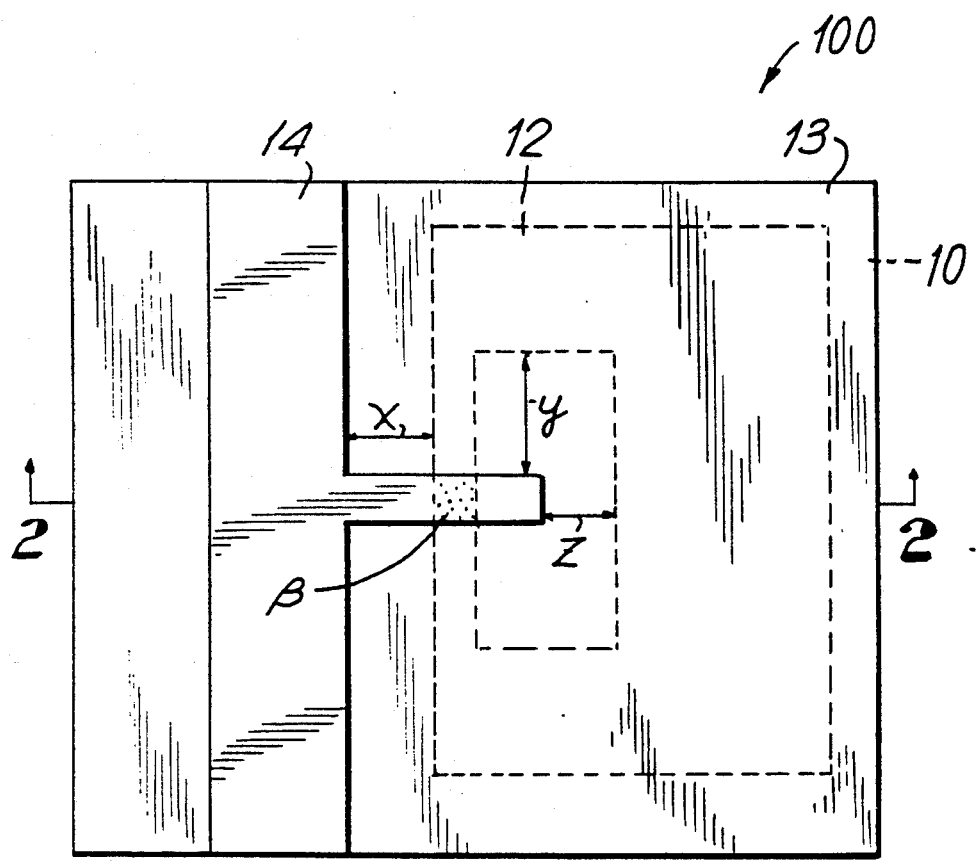
FIG. 1 is a top plan view of a picture element and interpixel connection of an active matrix display arranged in accordance with the invention.

An active matrix display includes a plurality of pixel electrodes arranged in a matrix on a first insulating substrate with a plurality of parallel first line electrodes arranged in a column or row direction with an active layer of a ferroelectric material between the first line electrode and the pixel electrode. A plurality of second line electrodes are arranged in a line direction on an opposed second insulating substrate with an electro-optical material in the space between the two insulating substrates. The active matrix display is driven in accordance with the invention by sequentially applying a selective voltage $V_0$ to each of the first or second line electrodes and applying a data voltage $V_1$ to the other electrodes wherein the range of the absolute value $|V_1|$ of the data voltage $V_1$ is expressed by $$|V_1| < E_c \cdot d_F (C_{LC} + C_F)/C_{LC}$$

wherein $E_c$ is defined as the coercive electric field of the ferroelectric material, $d_F$ is defined as the thickness of the active layer, $C_F$ is defined as the capacitance of one pixel of the active layer and $C_{LC}$ is defined as the capacitance of one pixel of material provided with an electro-optical effect.

The absolute value $|V_F|$ of a voltage $V_F$ is expressed by $$|V_1| \cdot C_{LC}/(C_{LC}+C_F)$$

wherein $V_F$ is the voltage in the ferroelectric material, $C_F$ is defined as the capacitance of one pixel of the active layer and $C_{LC}$ is defined as the capacitance of one pixel of material provided with the electro-optical effect. Voltage $V_F$ may be applied to the active layer having a time period from the moment when the voltage $V_F$ is applied to the active layer until half of the spontaneous polarization in the active layer is inverted. Therefore, the time period of voltage $V_F$ is set to be greater than the selective time period.

To drive the active matrix display, during the selective period, the selective voltage $V_0$ is sequentially applied to the first or second line electrodes. Concomitantly, the data voltage $V_1$ is sequentially applied to the second or first line electrodes, causing the spontaneous polarization in the active layer to be inverted. In other words, when the selective voltage $V_0$ is applied to the first line electrodes, the data voltage $V_1$ is applied to the second line electrodes. In an alternative embodiment, when the selective voltage $V_0$ is applied to the second line electrodes, the data voltage $V_1$ is applied to the first line electrodes. Subsequently, during the non-selective period, the voltage $V_{LC}$ is applied to the liquid crystal by the data voltage $V_1$ and the voltage expressed by $$\frac{C_{LC}}{C_{LC}+C_F} \cdot V_1$$

is applied to the active layer by data voltage $V_1$. After the driving voltage activates the inversion of the spontaneous polarization in the active layer, the change in the remanent polarization varies the voltage $V_{LC}$ applied to the liquid crystal. This in turn causes the liquid crystal to be modulated. The unwanted modulation may be avoided by decreasing the value of voltage $V_1$ such that $$\frac{C_{LC}}{C_{LC}+C_F} \cdot |V_1| \angle E_c d_F.$$

The remanent polarization created in the active layer during the selective period does not vary. Accordingly, the electric field corresponding to the remanent polarization is applied to the liquid crystal to carry out the alternate driving cycle without generating cross-talk. Therefore, by setting the absolute value of the voltage $V_F$ such that the inversion of the spontaneous polarization may be avoided by allowing the time from the moment when the voltage $V_F$ is applied to $$V_F = \left( |V_1| \cdot \frac{C_{LC}}{C_{LC}+C_F} \right)$$

the active layer until half of the spontaneous polarization is inverted to be at least greater than the selective period. In this manner, the voltage greater than the above described voltage $E_c \times d_F$ may be applied to the active layer.

EXAMPLE 1

Figure 2:
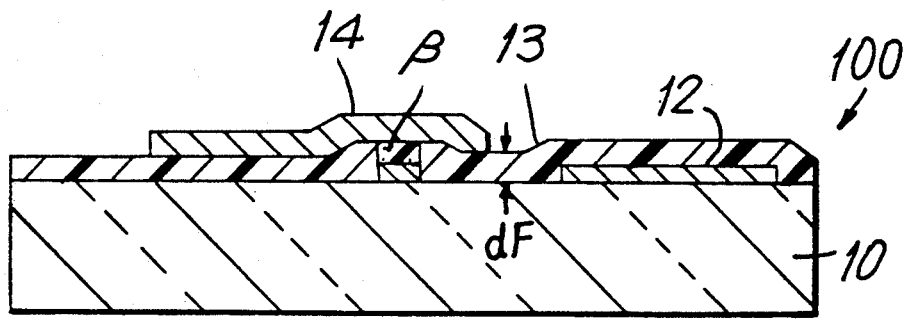
FIG. 2 is a cross-sectional view of the interpixel connection of FIG. 1 taken along line 2—2.

FIGS. 1 and 2 show a portion of an active matrix substrate 100 for use in an active matrix display constructed and arranged in accordance with the invention. Active matrix device substrate 100 includes a pixel electrode 12 of indium tin oxide (hereinafter "ITO") formed and photoetched across an insulating substrate 10 of glass. A ferroelectric layer 13 of a copolymer of vinylidene fluoride (hereinafter "VDF") and trifluoroethylene (hereinafter "TrFE") is disposed on substrate 10 over pixel electrode 12. A first electrode 14 of aluminum is formed on ferroelectric layer 13.

The thickness of ferroelectric material formed between pixel electrode 12 and first electrode 14 is defined as $d_F$. Thickness $d_F$ is less than the distances X, Y and Z which are the minimum distance between any point of pixel electrode 12 and first electrode 14 along the plane of substrate 10. Thus, a voltage may be applied between first electrode 14 and pixel electrode 12 to invert the spontaneous polarization in ferroelectric active layer 13 in region $\beta$. It is possible to select a voltage so that the thickness $d_F$ of the ferroelectric material which is less than the dimensions in the directions X, Y and Z does not invert the spontaneous polarization of ferroelectric layer 13 at region $\beta$ between first electrode 14 and pixel electrode 12. By inverting only the polarization in the direction of thickness $d_F$ such that $d_F << X$, $d_F << Y$ and $d_F << Z$, the capacitance of active element in region $\beta$, specifically the capacitance $C_F$ of ferroelectric layer 13 is substantially determined in the region $\beta$ shown in FIGS. 1 and 2. Accordingly, the active element in region $\beta$ is the active region of ferroelectric layer 13.

Each component of the active matrix substrate may be formed and photoetched by depositing first electrode 14 on insulating substrate 10, depositing ferroelectric layer 13 thereon and depositing pixel electrode 12 on ferroelectric layer 13. A liquid crystal panel 200, including an active matrix substrate as shown in FIGS. 1 and 2 is shown in cross-section in FIG. 3. Liquid crystal panel 200 includes pixel electrode 12 of ITO, ferroelectric layer 13 a copolymer of VDF and TrFE on a insulating substrate 10 provided with first electrode 14 of aluminum are all formed and photoetched across to define active substrate D. An opposed substrate E has an ITO second electrode 16 formed on an insulating glass substrate 15 to form substrate E. Substrate D and E are arranged opposed with one another with a liquid crystal material F sandwiched therebetween.

Liquid crystal F may be any material which provides an electro-optical effect, such materials include but are not limited to an electroluminescence material, a gas, a material varying the permeability of light by the electric field, an electrochromic material, a material varying its emitting and non-emitting characteristics or a material having varied colors.

The configuration of pixel electrode 12, first electrode 14 and second electrode 16 is not limited specifically to that as shown o ITO and/or aluminum. Other materials used for the construction of the electrode include, but are not limited to an electro-conductive material, such as a metal, a transparent electrode formed of $SnO_2$, a semiconductor, a silicide, an electro-conductive high polymer, an electro-conductive coating and a super conductive material. Additionally, the material used for insulating substrates 10 and 15 is not only limited to glass. The substrates may also be formed of an inorganic material such as a ceramic or an organic material such as plastic, acrylic or a vinyl fluoride.

The material used for ferroelectric layer 13 is not limited to that of VDF and TrFE copolymers. Other ferroelectric materials may be used including, for example, perovskite, $BaTiO_3$, $PbTiO_3$ and $WO_3$, Rochelle salt, deuterium Rochelle salt, Rochelle salt type ferroelectrics such as tartrate, the potassium dihydrophosphate alkali type ferroelectrics such as KDP, phosphate, arsenate, potassium dihydrogenphosphate, potassium dideuteriumphosphate, the guanidine type ferroelectrics such as GASH and TGS, other ferroelectrics such as potassium niobate, glycine sulfate, ammonium sulfate, sodium sulfite, potassium ferrocyanide (yellow prussiate of potash), cadmium antimony iodide, PZT or PLZT or amorphous ferroelectrics such as $LiNbO_3$, or $LiTaO_3$, the high polymer ferroelectrics such as polyvinylidene fluoride, vinylidene fluoride and its copolymer, the copolymer of VDF and TeFE (tetrafluoroethylene), the copolymer of vinylidene cyanide and vinyl acetate, the high polymer ferroelectrics such as the copolymer of VDF and TrFE, and a single crystal or non-single crystal of $Bi_4Ti_3O_{12}$, Fe-B-P type and electret. Further, a composite of two or more materials of the above ferroelectrics or a composite with a paraelectric may be used to form ferroelectric layer 13.

Large remanent polarization and high switching speeds are provided by the inorganic ferroelectrics, such as $BaTiO_3$. A uniform ferroelectric layer can be obtained at relatively low cost within a large area substrate with an amorphous ferroelectric by applying the layer by the means of a spin coating method. Since ferroelectric layer 13 has a permittivity and a remanent polarization which substantially does not vary in its actual used temperature range, the temperature characteristics are stable. In addition, it is possible to use a ferroelectric material in which the power of the inorganic ferroelectric in an organic material is held within the material such that its diameter is in the range of 0.1 through 100 μm.

Figure 3:
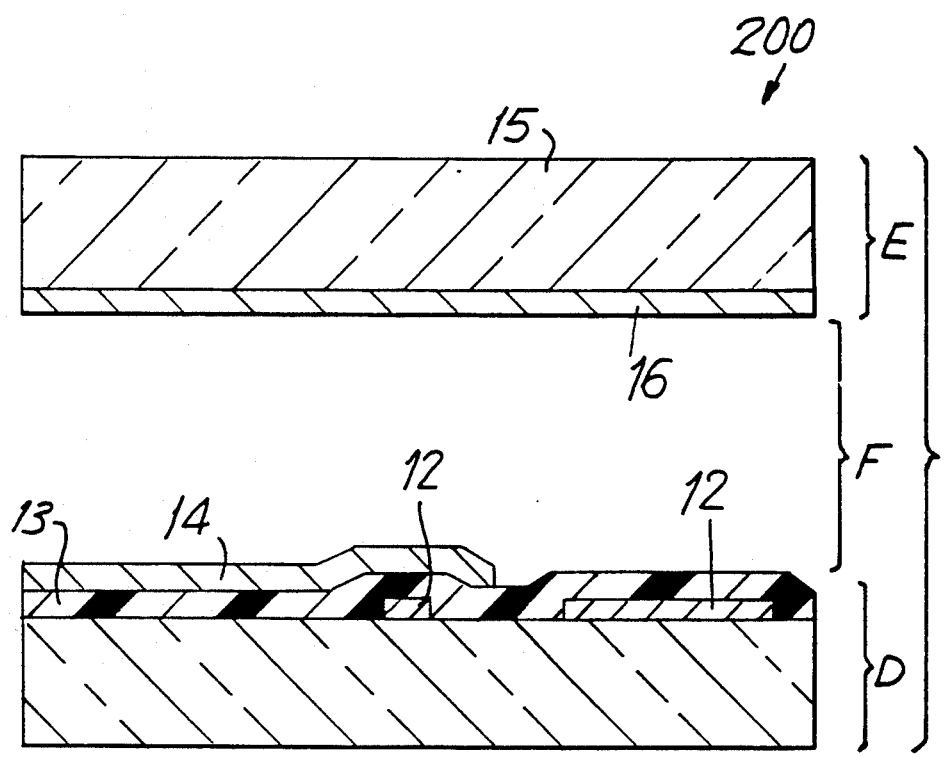
FIG. 3 is cross-sectional view of a liquid crystal panel including the active element of FIGS. 1 and 2.

FIG. 4 is a partial plan view of an active matrix display 300 arranged in accordance with the invention. Active matrix display 300 includes a matrix of liquid crystal pixels 200 as shown in FIG. 3 arranged in a matrix-type array as set forth in the prior art. As described above, liquid crystal F is sandwiched between pixel electrode 12, first electrode 14 and ferroelectric layer 13 formed across an insulating substrate 10 and a plurality of parallel spaced second electrode 16 formed in lines across second insulating substrate 15. First electrode 14 is connected in a constant direction such as the vertical direction as shown in FIG. 4.

Figure 5A:
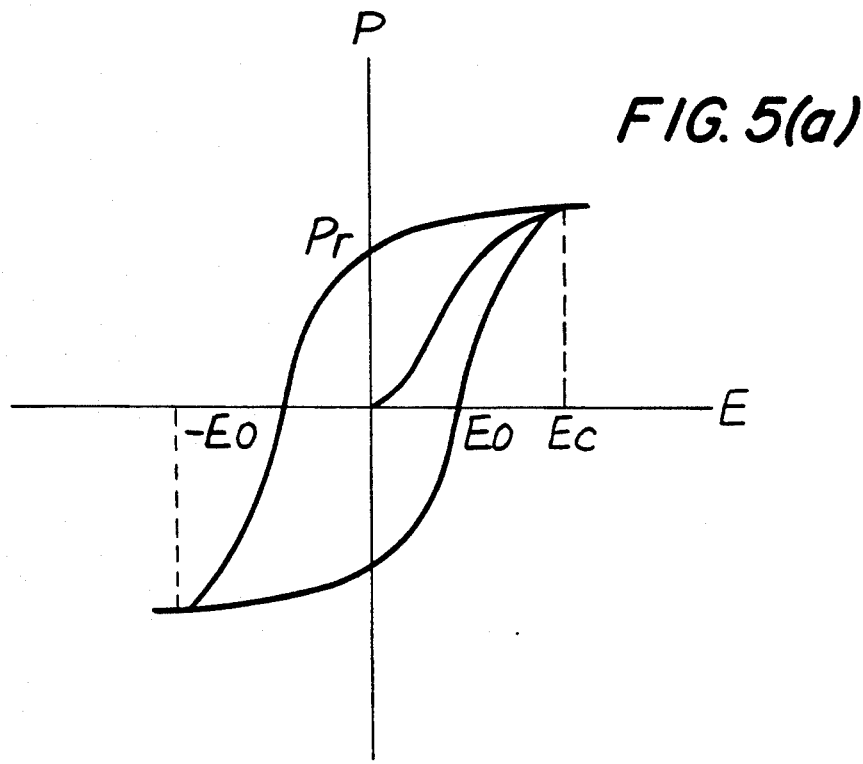
FIG. 5(a) is a graph showing the hysteresis curve of the ferroelectric material.

The properties of the ferroelectric material which forms the basis for driving the active matrix display in accordance with the invention can be explained by reference to FIGS. 5(a), (b), (c) and (d). The hysteresis curve of the ferroelectric material is shown in FIG. 5(a). Remanent polarization, Pr, is the density of electric charge remaining on the surface of the ferroelectric material after the electric field is removed. The applied presence of electric charges on the surface has been known, since the ferroelectric material has memory characteristics. The arrangement of the spontaneous polarization when remanent polarization Pr remains in ferroelectric layer 13 is shown in FIG. 5(b).

Figure 5B:
FIGS. 5(b), (c) and (d) show the direction of spontaneous polarization of the ferroelectric material at different steps during the driving of the liquid crystal display.
Figure 5C:
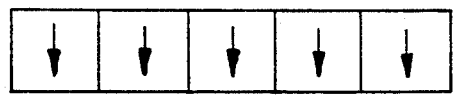
Figure 5D:

Positive surface electric charge is held on the surface of the ferroelectric material as shown by the arrows in FIG. 5(b). Negative surface charge is held on its opposite surface. When the electric field is sufficiently large for inverting the spontaneous polarization from the outside, the spontaneous polarization is inverted and arranged as shown in FIG. 5(c). This inversion occurs when the electric field is greater than the coercive electric field $E_c$. At this moment, the polarity of electric charge held on the surface of the ferroelectric material 13 is reversed. When the coercive electric field is applied and the ferroelectric material is a non-single crystal, the condition of spontaneous polarization in each crystal is random in a vertically oriented configuration. This state remains after the electric field is cut off as shown in FIG. 5(d) and the electric charge on the surface of the ferroelectric material becomes zero. Remanent polarization Pr can be controlled by the strength of the electric field and the time period being applied thereto.

The basic operation for one pixel or picture element will be explained by showing the equivalent circuit in FIGS. 6 (a), (b), (c) and (d) for one pixel of the active matrix display of the type shown in FIG. 4. One pixel corresponds to the liquid crystal panel shown in FIG. 3. Ferroelectric layer 13 and the capacitance of liquid crystal layer 17 are serially connected for the driving of one pixel.

Referring specifically to FIG. 6 (a), the condition in which the positive voltage is sufficient to invert spontaneous polarization of ferroelectric layer 13 is applied to ground terminal G is shown. In the selective period in a field, the spontaneous polarization points downward. By arranging the spontaneous polarization in one direction, the writing-in condition can be terminated. Then, terminal G is held in a ground electric potential condition as shown in FIG. 6 (b). The condition is the holding condition and corresponds to the non-selective period. In the holding condition, ferroelectric layer 13 is provided with an electric charge as expressed by $-S_F \times Pr$, wherein S; is defined as the area of ferroelectric 13 forming the active layer, and a distributing charge $+Q_{LC}$ of the free electric charge between liquid crystal layer 17 and ferroelectric layer 13.

Liquid crystal layer 17 is provided with an electric charge of $Q_{LC} = -C_{LC}V_{LC}$. Further, voltages $V_F$ and $V_{LC}$ which are applied to ferroelectric layer 13 and liquid crystal layer 17 are equivalent. Therefore, the relation shown below can be obtained:

$$Q_F = -S_F \cdot P_r + Q_{LC} = C_F V_F \quad (1)$$

$$Q_{LC} = -C_{LC} V_{LC} \quad (2)$$

$$V_F = V_{LC} \quad (3)$$

wherein $Q_{LC}$ designates the electric charge applied across liquid crystal layer 17, $C_{LC}$ defines the capacitance of liquid crystal layer 17, $Q_F$ is the electric charge applied to ferroelectric layer 13 and $V_F$ is the capacitance of the ferroelectric material in ferroelectric layer 13.

Accordingly, from formulas (1), (2) and (3) above, the following may be obtained:

$$V_F = V_{LC} = \frac{-S_F P_r}{C_F + C_{LC}} \quad (4)$$

$$Q_{LC} = \frac{-C_{LC} S_F P_r}{C_F + C_{LC}} \quad (5)$$

$$Q_F = \frac{-C_F S_F P_r}{C_F + C_{LC}} \quad (6)$$

The voltage expressed by formula (4) is held in liquid crystal layer 17 in a non-selective period, specifically the holding period.

It is known that voltage $V_{LC}$ applied to liquid crystal layer 17 is proportional to remanent polarization Pr from formula (4). As described above, since remanent polarization Pr is provided with memory characteristics, leakage current is not generated across ferroelectric layer 13. In fact, ferroelectric layer 13 is provided with excellent holding characteristics for $V_{LC}$. Therefore, the active matrix device may obtain a large write-in capacitance and no leakage electric current to provide an image having a clear and high contrast.

Figure 6A:
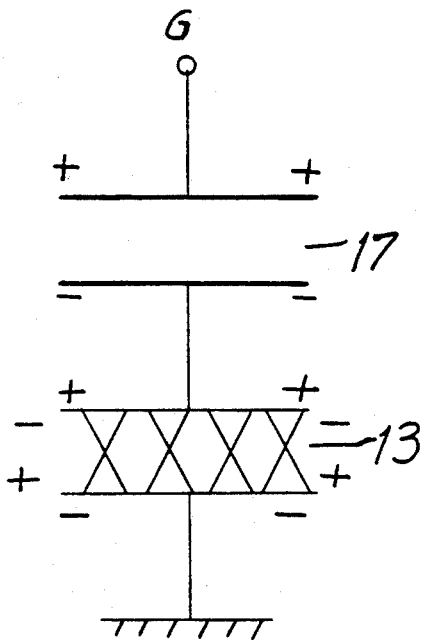
FIGS. 6(a), (b), (c) and (d) are equivalent circuit diagrams of one pixel of the active matrix display at different stages during the driving of the display.
Figure 6B:
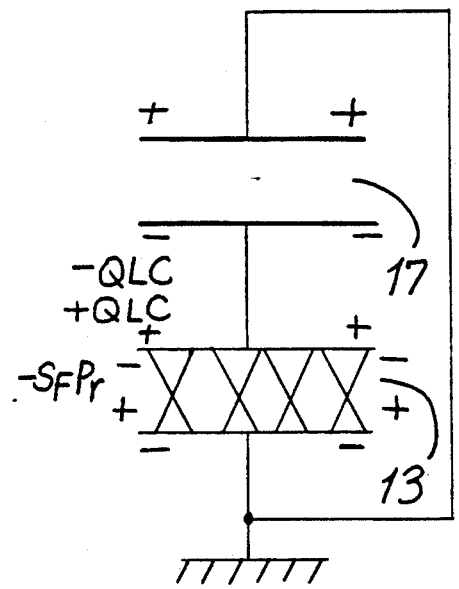
Figure 6C:
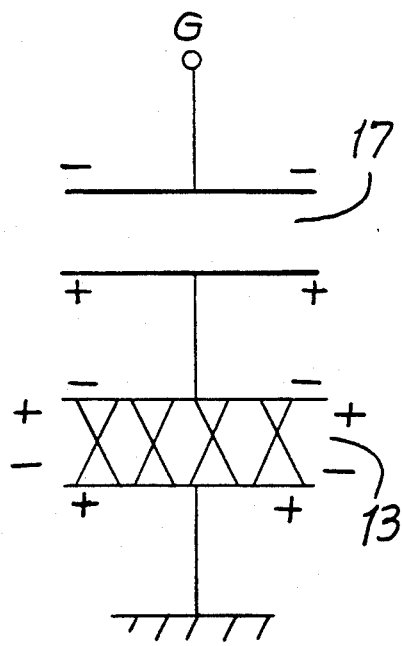
Figure 6D:
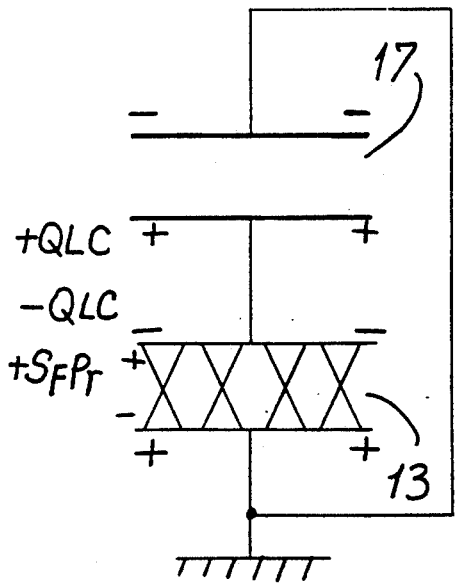

In the next field, as shown in FIG. 6(c), a negative voltage is applied to ground terminal G within the selective period and the spontaneous polarization is inverted upwards. Then, terminal G is held in a ground electric potential condition as shown in FIG. 6(d) within a non-selective period. This causes the voltage having reverse polarity to be applied in formulas (4), (5) and (6) to be applied to liquid crystal layer 17 causing the charge in ferroelectric layer 13 to be held.

As set forth in formula (4), by varying Pr to control the value of voltage $V_g$, voltage $V_{LC}$ can be controlled. In the case, when the ferroelectric layer is a non-single crystal, and particularly when it is a multi-crystal ferroelectric material, remanent polarization Pr can be easily controlled.

On an actual active matrix display, terminal G in FIG. 6 is not kept at a ground level within a non-selective period. Rather, data voltage $V_1$ is applied to terminal G so that a disturbance electric potential or noise is applied to liquid crystal layer 17 which is represented by:

$$\pm \frac{C_F}{C_{LC} + C_F} V_1.$$

In the preferred embodiment, in order to reduce the noise, $C_{LC}/C_F$ should be large so that it is a value greater than 1, and if possible, greater than 10.

When voltage $V_g$ is applied to ground terminal G in the selective period, then the following voltage is applied to ferroelectric layer 13:

$$\pm \frac{C_{LC}}{C_{LC} + C_F} V_g.$$

Since the spontaneous polarization is reversed by the applied voltage for the writing-in operation, the inputted applied voltage should be large. Therefore, the value of $C_{LC}/C_F$ should be large such that it is greater than 1 and, if possible, greater than 10.

By applying $V_1$ to terminal G in the non-selective period, the voltage $V_F$ applied to ferroelectric layer 13 is represented by $$\pm V_F = \frac{C_{LC}}{C_{LC} + C_F} V_g.$$

When the spontaneous polarization in ferroelectric layer 13 is inverted by $V_F$ in the non-selective period, remanent polarization Pr is varied. At the same time, voltage $V_{LC}$ applied to liquid crystal layer 17 is varied in accordance with formula (4). Accordingly, the voltage written into liquid crystal layer 17 in the selective period is modulated in the non-selective period. As a result, cross-talk is generated during actual display causing degradation of the display quality.

In order to avoid cross-talk, the inversion of the spontaneous polarization must be avoided. This can be done by setting the electric field applied to ferroelectric layer 13 to be less than the coercive electric field by voltage $V_F$ as expressed by the following formula:

$$\frac{C_{LC}}{C_{LC} + C_F} |V_1| \angle E_c \cdot d_F \quad (7)$$

wherein $E_c$ defines the coercive electric field of ferroelectric material forming ferroelectric layer 13, $d_F$ defines the thickness of ferroelectric layer 13, $C_F$ defines the capacitance formed by ferroelectric layer 13 in the active device of one pixel and $C_{LC}$ defines the capacitance of liquid crystal layer 17 for one pixel. When the conditions of formula (7) are satisfied, cross-talk is avoided.

Figure 4A:
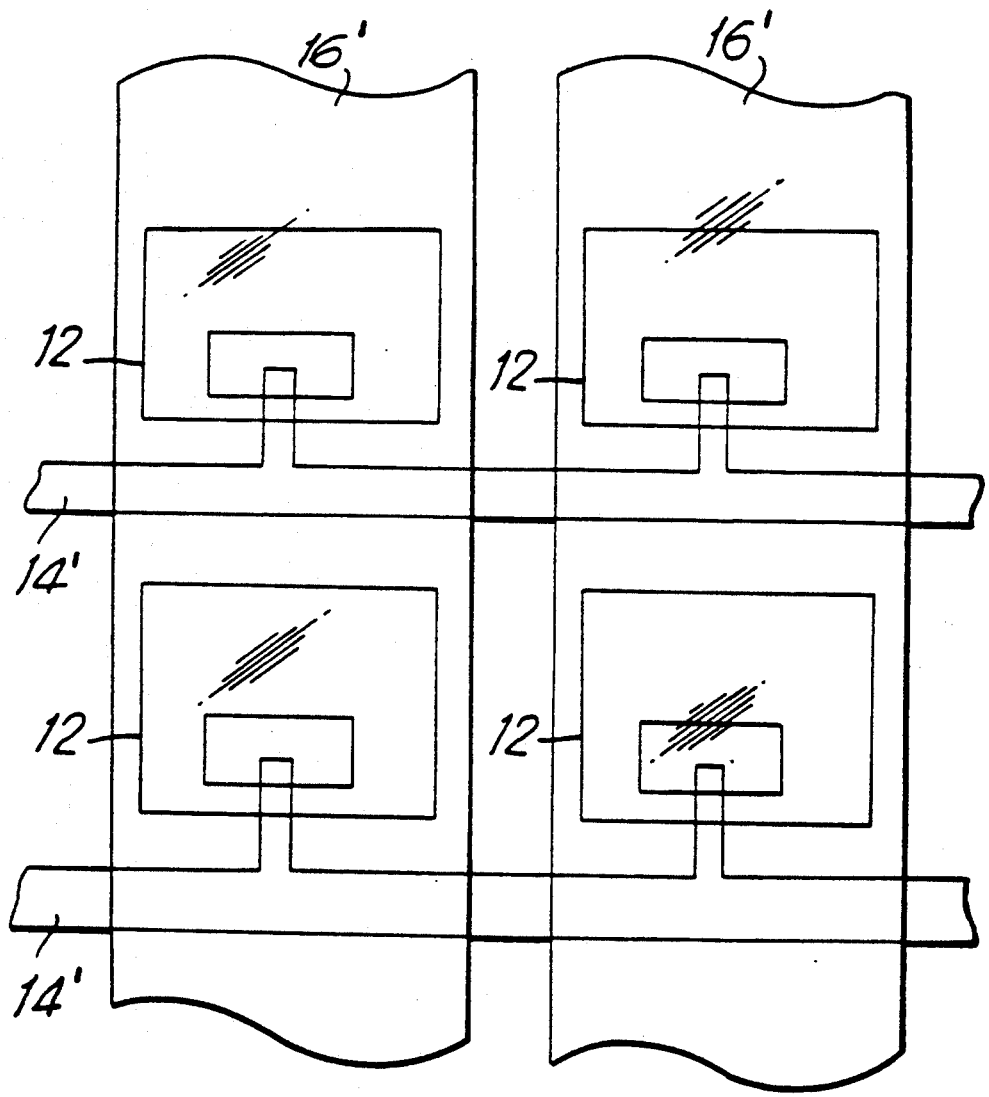
FIG. 4(a) is a plan view of a portion of an active matrix display prepared in accordance with an alternative embodiment of the invention.
Figure 7:
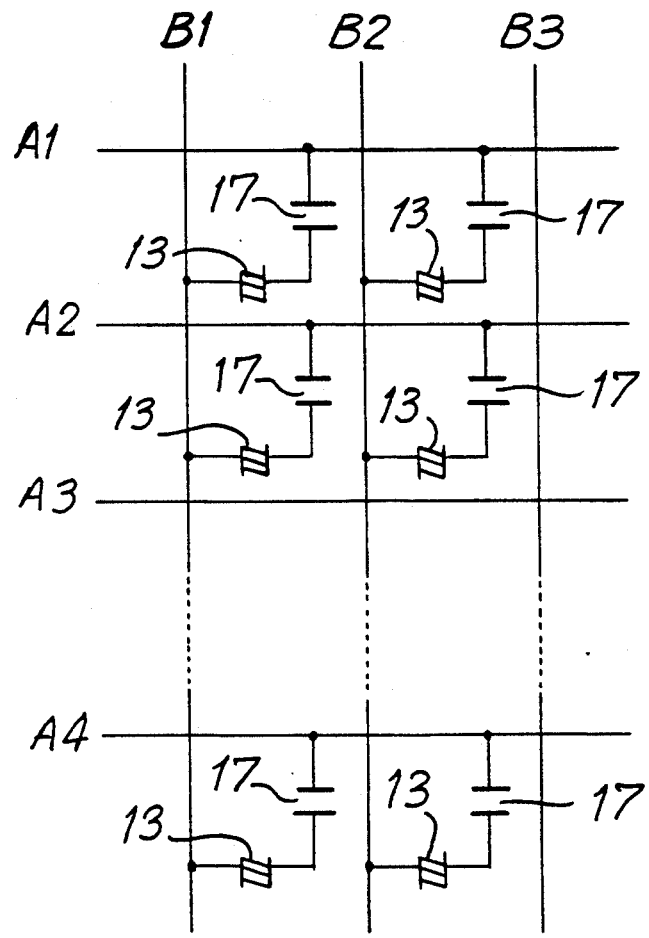
FIG. 7 is an equivalent circuit diagram of the active matrix display device.

FIG. 7 is an equivalent circuit of an active matrix display of the type shown in FIG. 4. Second electrode 16 of opposed substrate 15 forms the selective line group A1, A2, A3 and A4. First electrode 14 of first substrate 10 having ferroelectric layer 13 thereon forms data line group B1, B2 and B3. Each pixel is formed by connecting the liquid crystal with ferroelectric layer 13 in series. In an alternative embodiment, the arrangement may be configured such that second electrode 16< forms the data line group and first electrode 14' forms the selective line group as shown, in FIG. 4(a).

Figure 8:
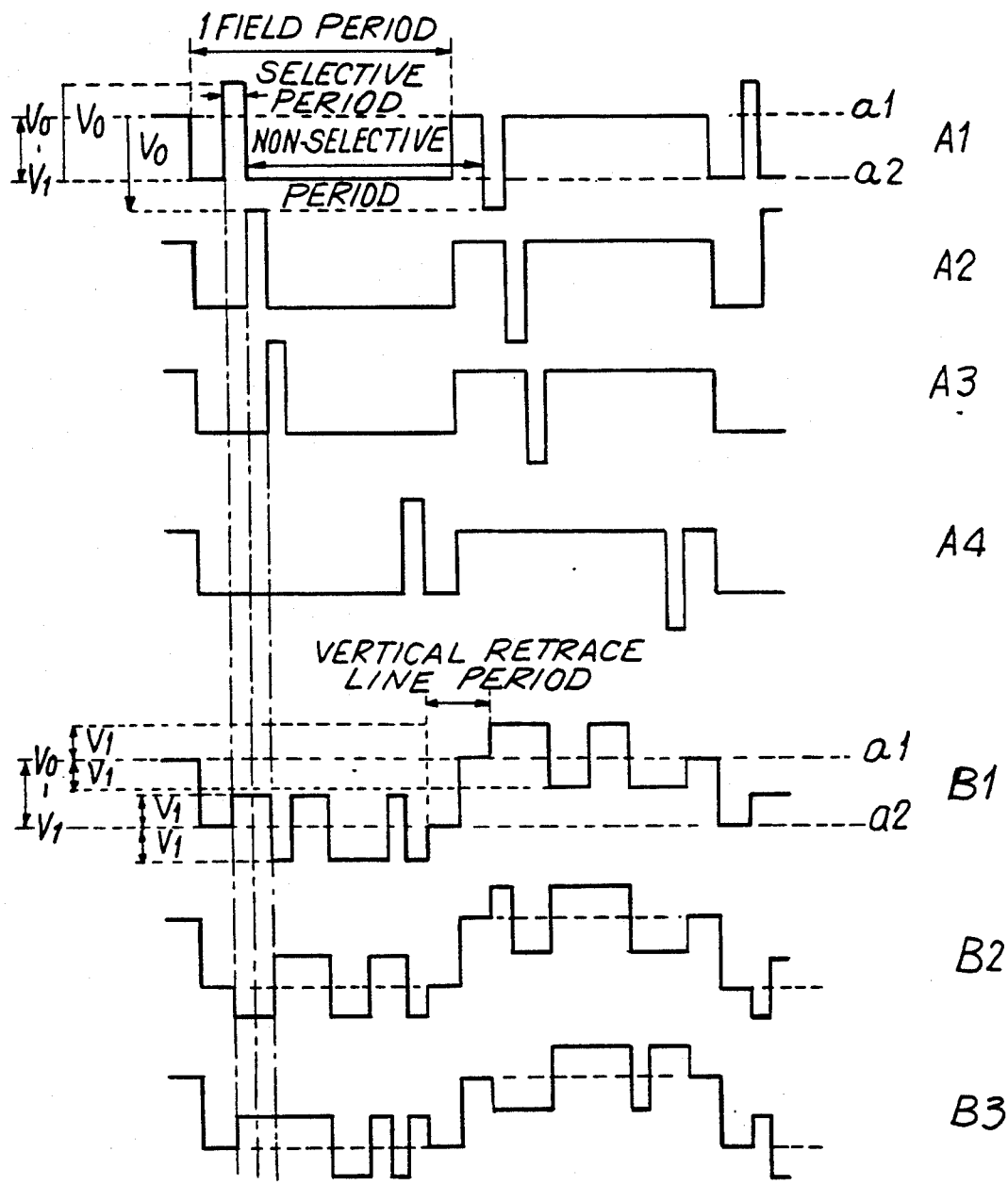
FIG. 8 are waveforms illustrating the method for driving the active matrix device in accordance with the invention.

In FIG. 8, a driving method for the active matrix display in accordance with the present example is shown. Waveforms A1 through A4 and B1 through B4 in FIG. 8 designate the electric potential applied to selective lines A1 through A4 and the electric potential applied data lines B1 through B3 respectively of FIG. 7. $V_0$ designates the selective voltage and $V_1$ designates the data voltage. In this configuration, when $C_{LC}$ is greater than $C_F$ ($C_{LC} > C_F$), almost all the voltage applied to the selective line and the data line are applied to ferroelectric layer 13.

When selective line A1 is selected in a field, the series connection between ferroelectric layer 13 and liquid crystal layer 17 of a pixel are written into the active matrix display corresponding to the data of the ON and OFF state of liquid crystal layer 17. The data corresponding to the ON and OFF state of the liquid crystal is applied respectively with the voltage such that $$V(ON) = V_0 + V_1 \quad (8)$$

$$V(OFF) = V_0 - V_1 \quad (9)$$

The voltage V (NON-SELECTED) = $V_1$ is applied to the non-selective lines; wherein V (ON) and V (OFF) have the following relationships:

$$V(ON) > V(OFF) \geq d_F E_c \quad (10)$$

between electric field $E_0$ and electric field $E_c$ in FIG. 5(a). The spontaneous polarization of ferroelectric layer 13 activates selected pixel O and non-selected pixel n as shown in FIGS. 5(b) and (d). The voltage corresponding to the remanent polarization is applied to the liquid crystal, driving each pixel between an ON and OFF state.

The period for each pixel is sequentially and serially selected in the order of A1, A2, A3, etc. Accordingly, the data is written into the respective pixels. When the selective period has terminated, the panel returns to the non-selective period.

When one field has passed and A1 is re-selected, the reverse voltage of the voltage expressed by formulas (8), (9) and (10) is applied to ferroelectric layer 13 of the pixel corresponding to the ON and OFF state. The voltage a represented by $$V(\text{NON-SELECTED}) = \pm V_1 \quad (11)$$

is applied to the non-selected ferroelectric layer. In this manner, V in formula (11) satisfies formula (7). Further, the spontaneous polarization of ferroelectric layer 13 of the selected and non-selected pixels are shown in FIGS. 5(c) and (d). The electric field corresponding to the remanent polarization of each is applied to the liquid crystal. The alternate driving of the two cycles is carried out when the liquid crystal switches between the ON and OFF states.

Figure 9:
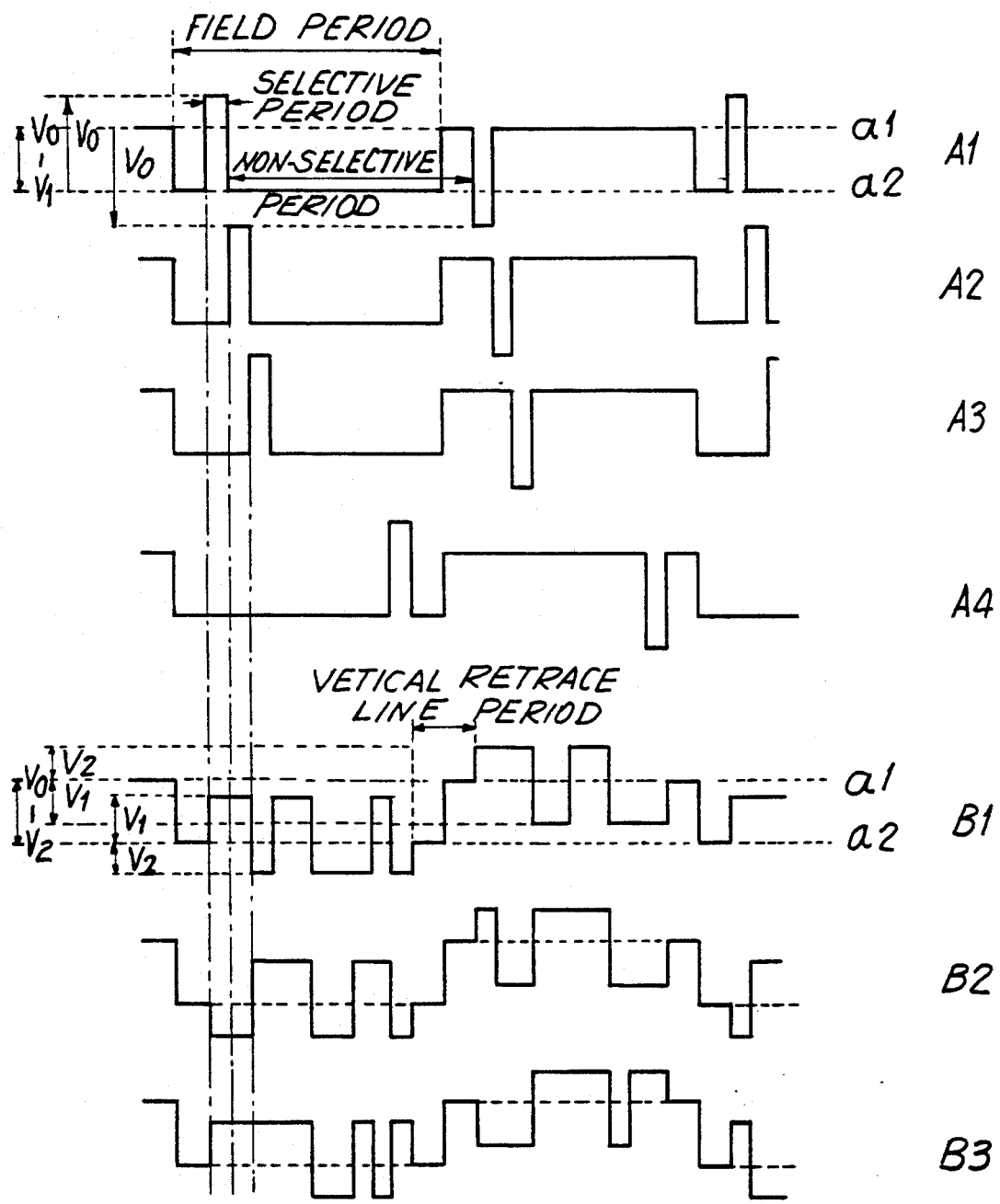
FIG. 9 are waveforms illustrating the method for driving the active matrix display in accordance with another embodiment of the invention.

FIG. 9 illustrates the method for driving an active matrix display in accordance with another embodiment of the invention. The basic operation is similar to the driving method of FIG. 8. However, a difference exists in that the basic voltage $a_1$ or $a_2$ is applied with a non-symmetrical data voltage including two voltages such as $V_1$ and $V_2$. In this manner, by using the non-symmetrical component of the non-symmetrical data voltage, the voltage applied to the liquid crystal can be increased while the contrast of the active matrix display is increased. In FIG. 9, since $V_1$ is greater than $V_2$, both $V_1$ and $V_2$ can be selected to avoid the inversion of the spontaneous polarization in one field or one frame period. Therefore, inverted spontaneous polarization becomes less than half of the total spontaneous polarization as set forth by formula (7).

In the method shown in FIG. 9, $V_1$ is greater than $V_2$. In an alternative embodiment, $V_2$ can be greater than $V_1$. The switching cycle of the basic electric potential $a_1$ and $a_2$ in FIG. 9 is similar to that set forth in FIG. 8. The value of $a_1$ minus $a_2$ is equal to $V_0$ minus $V_2$ ($a_1 - a_2 = V_0 - V_2$), but it is not only limited thereto. The vertical retrace line in FIG. 9 is similar to the period in FIG. 8.

Figure 13:
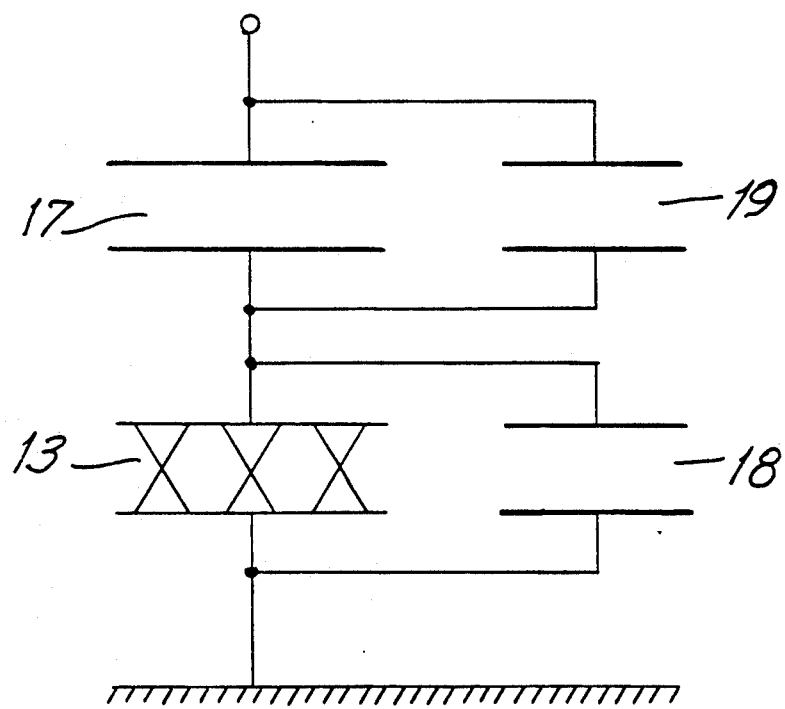
FIG. 13 is an equivalent circuit diagram of one pixel with parasitic capacitance and an additional capacitor in accordance with an alternative embodiment of the invention as shown in FIG. 12.

As shown in FIG. 13, when parasitic capacitance Cp 18 of a pixel is calculated with the capacitance $C_F$ of ferroelectric layer 13 and the additional capacitance $C_a$ is alternately used with liquid crystal layer 17, the following relation is obtained between electric field $E_F$ and voltage $V_1$:

$$E_F = \frac{V_F}{d_F} = \frac{C_{LC} + C_a}{C_{LC} + C_a + C_F + C_p} \cdot \frac{|V_1|}{d_F} \quad (12)$$

In accordance with formula (12), electric field $E_F$ may be selected to prevent inversion of the spontaneous polarization within the selective period, or the inverted spontaneous polarization to be less than half of the total spontaneous polarization. This analysis is similar to the application of formula (7).

EXAMPLE 2

In this example, a higher voltage is applied to ferroelectric layer 13 by considering the inverting speed of the remanent polarization Pr. In the driving cycle, the electric field $E_F$ to be applied to ferroelectric layer 13 is expressed by the following formula:

$$E_F = \frac{V_F}{d_F} = \frac{C_{LC}}{C_{LC} + C_F} \cdot \frac{|V_1|}{d_F} \quad (13)$$

wherein $d_F$ defines the thickness of ferroelectric layer 13, $C_F$ defines the capacitance of the active matrix device for one pixel and $C_{LC}$ defines the capacitance of liquid crystal layer 17 for one pixel.

Figure 10:
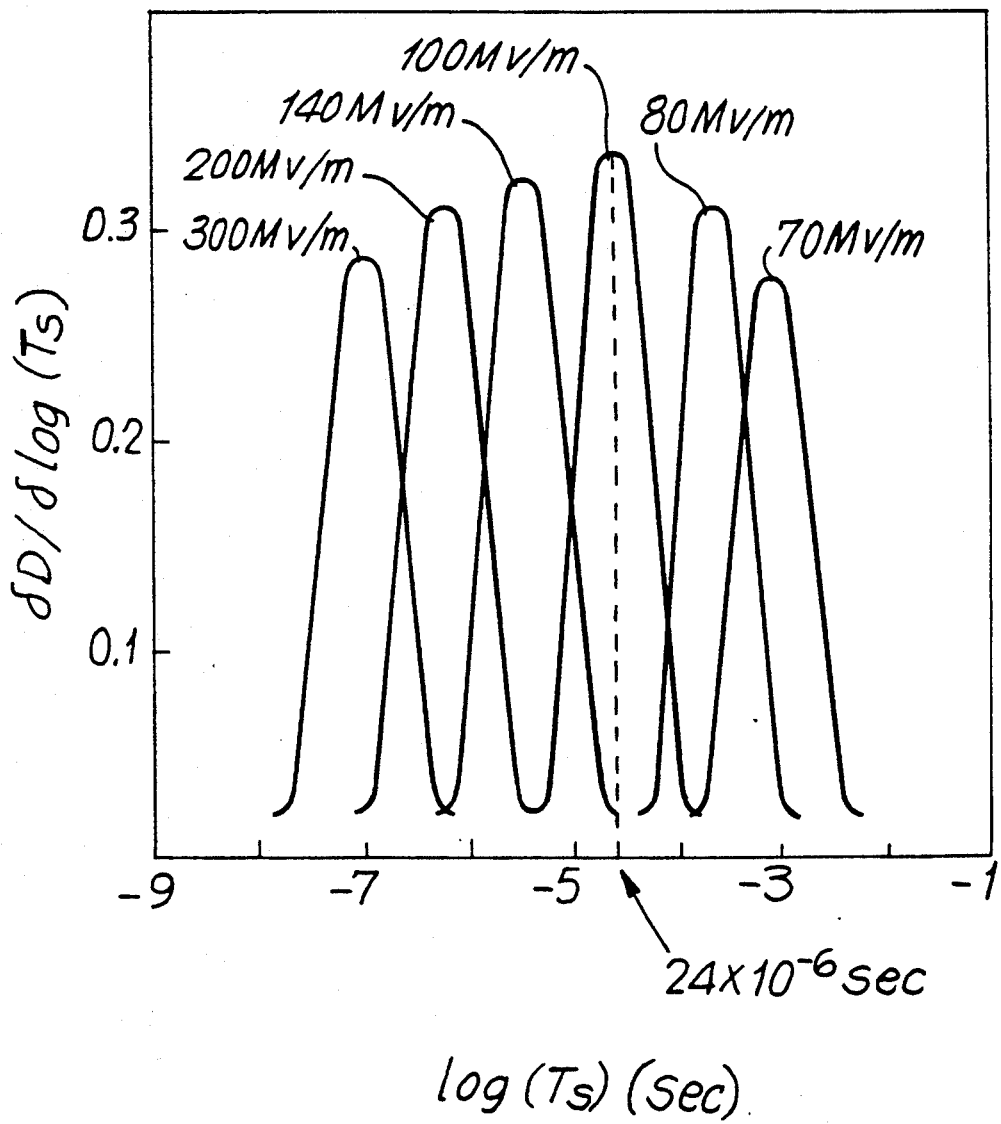
FIG. 10 is a graph plotting the relation between the time differential and the electricity displacement of the ferroelectric material.
Figure 11:
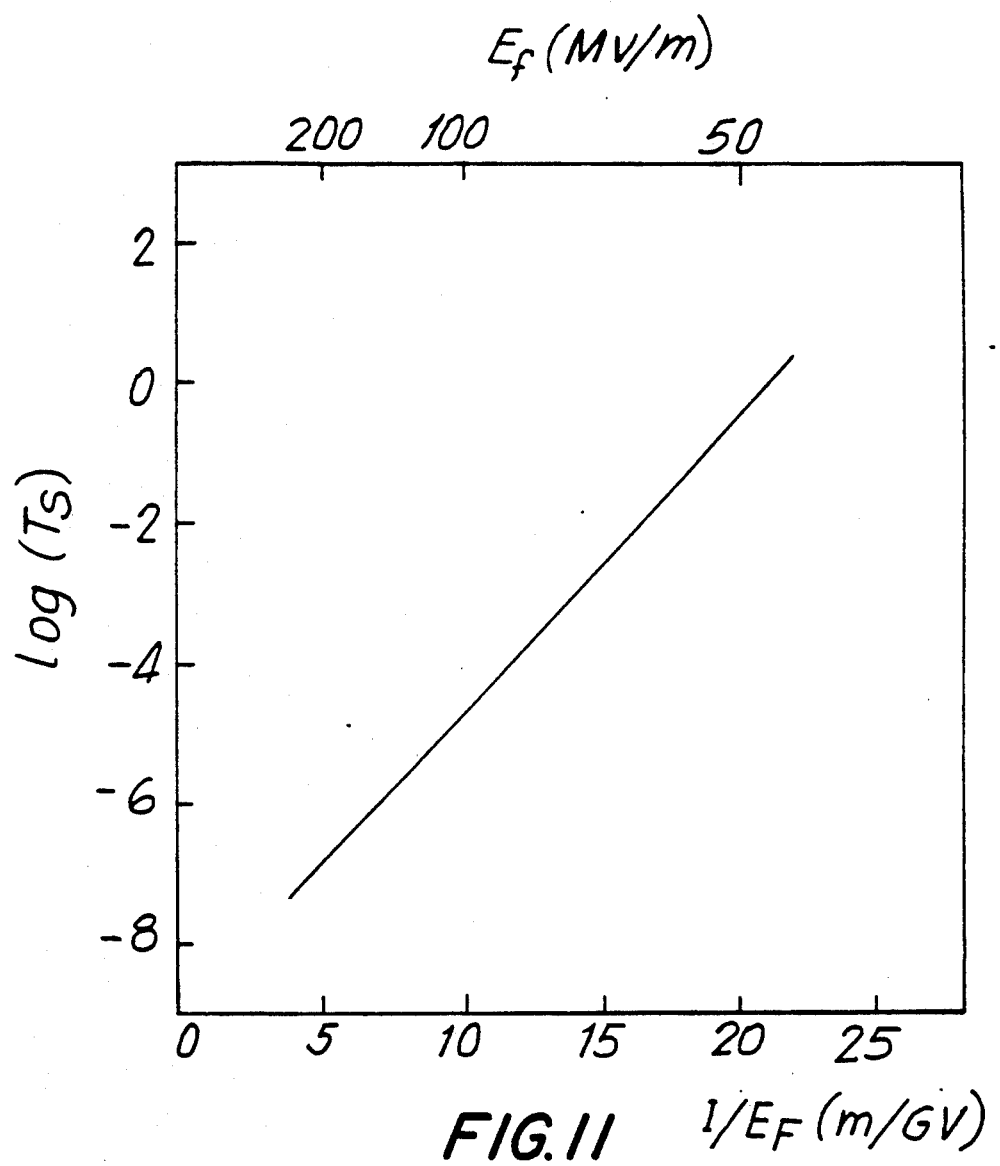
FIG. 11 is a graph showing the relationship between time and the electric field of the ferroelectric material.

The dependency of $E_F$ to the inversion speed of the spontaneous polarization of the VDF and TrFE copolymers is shown in FIGS. 10 and 11. In FIG. 10, the logarithm of time versus the time differential of electricity displacement according to the inversion of the spontaneous polarization is plotted thereon as disclosed in *Japanese Journal of Applied Physics*, Vol. 24, No. 8, p. L661. The curves in the graph correspond to the degree of each electric field as applied to a ferroelectric layer. As the electric field increases, the curve shifts to the high speed side as depicted on the left side in FIG. 10. The graph demonstrates the correspondence of the inversion speed $T_s$ as the spontaneous polarization increases.

Each curve discloses the following information. The left base or short time side of each curve depicts the starting time of the inversion of the spontaneous polarization. The right base or the long time side depicts the time in which the inversion of the spontaneous polarization is terminated. Accordingly, there is no inversion of the spontaneous polarization on the left base or the short time side of each curve. The top of the curve shows the moment of time when half of the total spontaneous polarization is inverted. In FIG. 11, the relation between time $T_s$ is shown wherein time $T_s$, which depends upon electric field $E_F$ or voltage $V_F$, defines the time corresponding to the top of the curve in FIG. 10.

The electric field $E_F$ which does not cause inversion of spontaneous polarization can be determined as follows. For example, as shown in FIG. 10, when the selective period is defined as $24 \times 10^{-6}$ sec, the spontaneous polarization of electric field $E_F$ is not inverted under the conditions in which it is less than 100 MV/m. Since the left base of the curve is in a position in which it is greater than $24 \times 10^{-6}$ sec as shown on the right side of the curve, the spontaneous polarization is not inverted in this time period. Under such conditions, electric field $E_F$ is selected when it is less than 100 MV/m. In another example, when the selective period is $5 \times 10^{-7}$ sec, electric field $E_F$ is less than 140 MV/m, as set forth in FIG. 10.

By selecting electric field $E_F$, inversion of spontaneous polarization can be avoided to prevent cross-talk. The result is obtained by allowing the time when spontaneous polarization in electric field $E_F$ starts inverting to be greater than the selective period. Electric field $E_F$, at this moment, is related to voltage $V_1$ as set forth in formula (13). In the selective period, cross-talk may be avoided with a limitation even if spontaneous polarization is not substantially inverted. However, it is preferable that the inversion amount be small, specifically an amount less than half. For example, when the selective period is $24 \times 10^{-6}$ sec, electric field $E_F$ can be selected to be less than 100 MV/m. In this example, $24 \times 10^{-6}$ sec corresponds to 100 MV/m as this time corresponding to the top curve. The curve shows that half of the total spontaneous polarization is inverted corresponding to a time $T_s$. Specifically, electric field $E_F$ can be selected to allow time $T_s$ in electric field $E_F$ to be greater than the selective period.

Accordingly, the time in which spontaneous polarization is inverted is defined as the selective period as set forth below. The selective period is the minimum time unit for the displaying operation of the active matrix display. Therefore, if the minimum time unit can be avoided, inversion of spontaneous polarization will be completely avoided, causing further avoidance of cross-talk within the active matrix display. However, in a different pattern (e.g., when the ON or the OFF state is connected to a plurality of pixels in the driving method as shown in FIG. 7), voltage $V_1$ is applied to ferroelectric layer 13 in a plurality of selective periods. Therefore, spontaneous polarization is only possibly inverted. To prevent this condition, voltage $V_1$ can be selected to avoid inversion of spontaneous polarization during the time in which a plurality of selective periods are gathered. As an example of this, the value of voltage $V_1$ is selected so that spontaneous polarization is not inverted in a time period greater than 2 to 10 times that of the selective period.

Further, voltage $V_1$ can be selected when the spontaneous polarization is not to be inverted in one field or one frame period. When one field or frame period is selected, cross-talk is not caused except in a remarkably special display pattern. Additionally, the effect on the prevention of the cross-talk can be expected as compared with the case in which it is in the selective period. In this example, electric field $E_F$ is selected when the selective period is one field period or one frame period.

In FIGS. 8 and 9, the switching time of the basic electric potential $a_1$ and $a_2$ may be established by $1/n$ (wherein n is an integer greater than 2) of the selective period. For example, when n equals 2, $V_1$ or $V_2$ is determined when the spontaneous polarization is not inverted or when the spontaneous polarization is less than half that of the total spontaneous polarization inverted by formula (7) within a half period of the time of one horizontal scanning period. According to the examples set forth in FIGS. 8 and 9, the switching time of the basic electric potential $a_1$ and $a_2$ may be established in m time large value (wherein m is an integral greater than 1) of the selective period.

Figure 12:
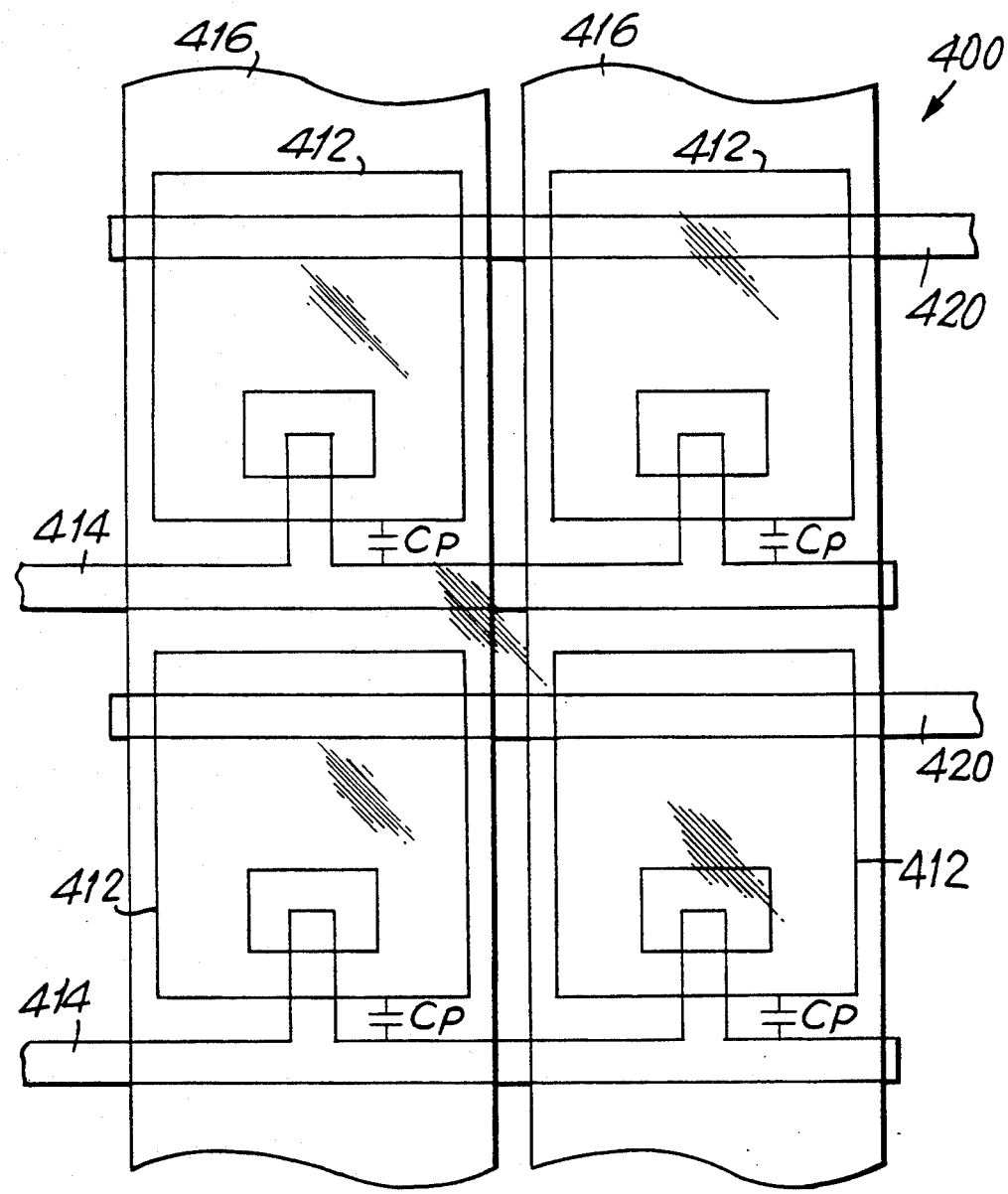
FIG. 12 is a plan view of a portion of an active matrix display showing parasitic capacitance and having an additional capacitor.

FIG. 12 is a plan view of a portion of an active matrix display 400 including a additional capacitance Ca and parasitic capacitance Cp. A plurality of pixel electrodes 412 are disposed on an insulating substrate 410 with a ferroelectric layer 413 deposited on pixel electrode 412. An additional capacitor electrode 420 of aluminum and a plurality of first electrodes 414 are deposited on ferroelectric layer 413. First electrode 414 and additional electrode 420 are formed by the same process. The additional capacitance Ca is formed between ferroelectric layer 413, additional capacitance electrode 420 and pixel electrode 412. As shown in FIG. 12, parasitic capacitance Cp is naturally formed between first electrodes 414 and pixel electrodes 412. This is shown for purposes of illustration only and other capacitances may be formed on an insulative substrate in other ways.

Figure 14:
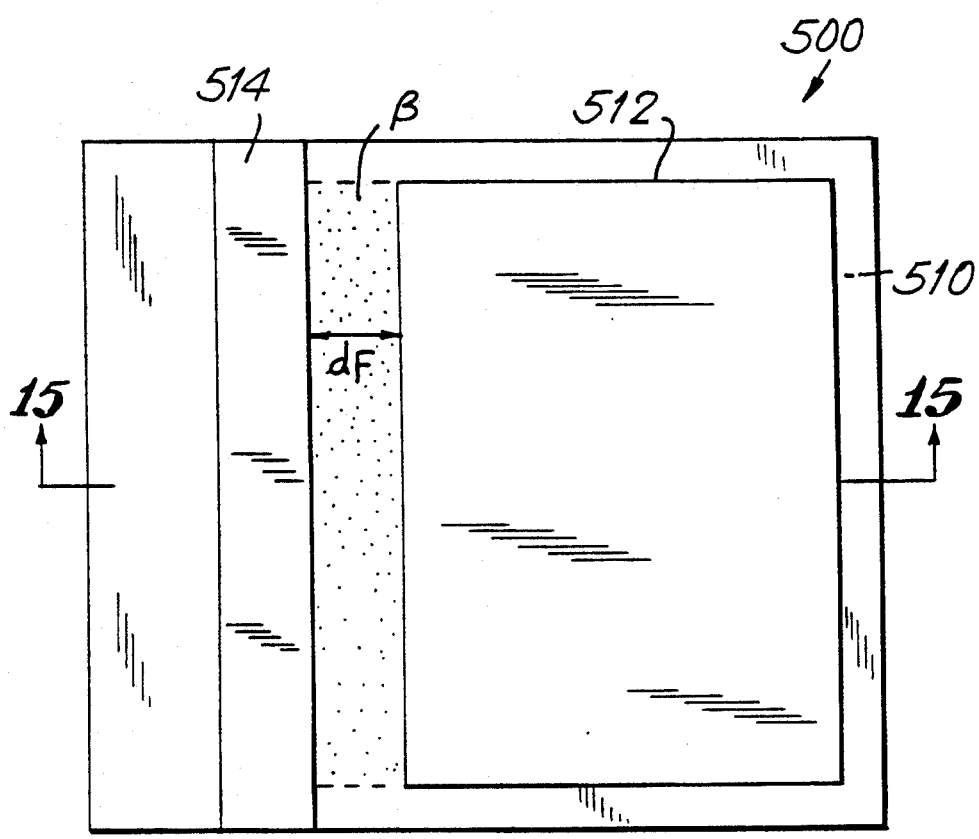
FIG. 14 is a top plan view of one pixel of an active matrix display in accordance with another embodiment of the invention.
Figure 15:
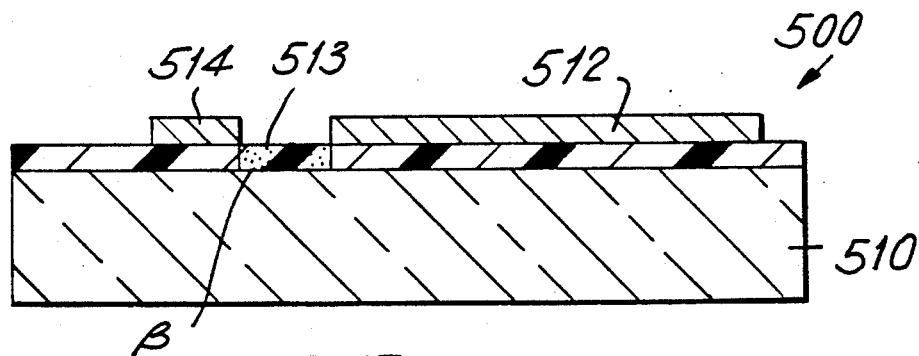
FIG. 15 is a cross-sectional view of the pixel of FIG. 14 taken along line 15—15 of FIG. 14.

FIGS. 14 and 15 show yet a further embodiment of an active matrix substrate 500 which can be driven in accordance with the method for driving an active matrix display. A ferroelectric layer 513 is disposed on an insulating substrate 510, with a plurality of pixel electrodes 512 and first electrodes 514 selectively deposited on ferroelectric layer 513. In an active matrix display including active substrate 500, the active layer of ferroelectric layer 513 disposed between first electrode 514 and pixel electrodes 512 is shown as a region $\beta$. In this configuration, first electrodes 514 and pixel electrodes 512 are not superimposed on each other. Accordingly, the thickness $d_F$ in formula (7) or (12) corresponds to the distance across region $\beta$ between first electrodes 514 and pixel electrodes 512 as shown in FIG. 14.

Accordingly, this embodiment enables the remanent polarization existing in the ferroelectric layer to remain stable without inverting the spontaneous polarization and the active layer in the non-selective layer, such that $$|V_1| < E_c \times d_F(C_{LC} + C_F)/C_{LC}$$

In this manner, the active matrix display can be driven without causing cross-talk and thereby obtaining an excellent quality on the display.

Further, by setting the value of the voltage $V_F$, the inversion of spontaneous polarization can be avoided even if greater voltage is applied to the active layer. The set voltage $V_F$ applied to the active layer allows the time from when it is applied to the ferroelectric layer until half the spontaneous polarization is inverted in the active layer to be greater than that of the selective period. Therefore, an excellent display quality is obtained without cross-talk even if a higher voltage is applied to the active layer.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for driving an active matrix display device having a active matrix substrate with a plurality of pixel electrodes disposed on a first insulating substrate in matrix array and a plurality of first line electrodes arranged in rows with a ferroelectric material as an active material disposed between the first electrodes and each pixel electrode, a second opposed insulating substrate having a plurality of second line electrodes arranged in columns for cooperating with the matrix of pixel electrodes and an electro-optical material disposed in the space between the substrates, comprising the steps of;

applying a selective voltage $\pm V_0$ to at least one of the plurality of the first line electrodes; and applying a data voltage $\pm V_1$ to at least one of the plurality of the second line electrodes so that the range of absolute value of the data voltage $|V_1|$ is represented by:

$$|V_1| < E_c \cdot d_F(C_{LC}+C_F)/C_{LC}$$

in which $E_C$ is a coercive electric field of the ferroelectric material, $d_F$ is the thickness of the ferroelectric material, $C_F$ is the capacitance of the active material at one pixel and $C_{LC}$ is the capacitance of the electro-optical material.

2. The method of claim 1, wherein the electro-optical material is a liquid crystal material and the capacitance of the liquid crystal material is $C_{LC}$.

3. The method of claim 1, wherein the selective voltage $\pm V_0$ is sequentially applied to the plurality of first line electrodes.

4. The method of claim 1, wherein the first line electrodes on the active matrix substrate include a plurality of projections, each projection for overlapping a portion of a pixel electrode.

5. The method of clam 1, wherein the first line electrodes on the active matrix substrate are in the same plane as the pixel electrodes and the active material is the ferroelectric material between the side edge of the first electrode and the side edge of pixel electrode.

6. A method for driving an active matrix display device having a active matrix substrate with a plurality of pixel electrodes disposed on a first insulating substrate in matrix array and a plurality of first line electrodes arranged in rows with a ferroelectric material as an active material disposed between the first electrodes and each pixel electrode, a second opposed insulating substrate having a plurality of second line electrodes arranged in columns for cooperating with the matrix of pixel electrodes and an electro-optical material disposed in the space between the substrates, comprising the steps of;

applying a selective voltage $\pm V_0$ to at least one of the plurality of the first line electrodes; and applying a data voltage $\pm V_1$ to at least one of the plurality of the second line electrodes so that the range of absolute value $|V_F|$ of a voltage $V_F$ is represented by:

$$V_F = |V_1| C_{LC}/(C_{LC}+C_F) = E_F d_F$$

in which $C_F$ is the capacitance of the active material at one pixel, $C_{LC}$ is the capacitance of the electro-optical material, $E_F$ is an electric field to be applied to the ferroelectric material, and $d_f$ defines the thickness of the ferroelectric material;

wherein application of voltage $V_F$ to the active material avoids inversion of spontaneous polarization in the active material and wherein a time period $T_S$ for inverting said spontaneous polarization is determined by $E_F$, and wherein $V_F$ is determined so that $T_S$ is longer than a selective period, said selective period representing the period of time during which inversion of the spontaneous polarization in the active material occurs.

7. The method of claim 6, wherein the voltage $V_F$ if applied in the time greater than the selective period.

8. The method of claim 6, wherein the reciprocal of electric field $E_F$ and time period $T_S$ form a linear relationship.

9. The method of claim 8, wherein the linear relationship is between the reciprocal of electric field $E_F$ and log of time period $T_S$.

10. The method of claim 6, wherein the electro-optical material is a liquid crystal material and the capacitance of the liquid crystal material is $C_{LC}$.

11. The method of claim 6, wherein the selective voltage $\pm V_0$ is sequentially applied to the plurality of first line electrodes.

12. The method of claim 6, wherein the first line electrodes on the active matrix substrate include a plurality of projections, each projection for overlapping a portion of a pixel electrode.

13. The method of claim 6, wherein the first line electrodes on the active matrix substrate are in the same plane as the pixel electrodes and the active material is the ferroelectric material between the side edge of the first electrode and the side edge of pixel electrode.

14. A method for driving an active matrix display device having a active matrix substrate with a plurality of pixel electrodes disposed on a first insulating substrate in matrix array and a plurality of first line electrodes arranged in rows with a ferroelectric material as an active material disposed between the first electrodes and each pixel electrode, a second opposed insulating substrate having a plurality of second line electrodes arranged in columns for cooperating with the matrix of pixel electrodes and an electro-optical material disposed in the space between the substrates, comprising the steps of;

applying a selective voltage $\pm V_0$ to at least one of the plurality of the first line electrodes; and applying a data voltage $\pm V_1$ to at least one of the plurality of the second line electrodes so that the range of absolute value $|V_F|$ of a voltage $V_F$ is represented by:

$$V_F = |V_1| C_{LC}/(C_{LC}+C_F) = E_F d_F$$

in which $C_F$ is the capacitance of the active material at one pixel, $C_{LC}$ is the capacitance of the electro-optical material, $E_F$ is an electric field to be applied to the ferroelectric material, and $d_f$ defines the thickness of the ferroelectric material;

wherein when inversion of the spontaneous polarization in the active material occurs, the reciprocal of electric field $E_F$ and a time period $T_S$ for inverting spontaneous polarization in the active material form a linear relationship.

15. The method of claim 14, wherein the electro-optical material is a liquid crystal material and the capacitance of the liquid crystal material is $C_{LC}$.

16. The method of claim 14, wherein the selective voltage $\pm V_0$ is sequentially applied to the plurality of first line electrodes.

17. The method of claim 14, wherein the first line electrodes on the active matrix substrate include a plurality of projections, each projection for overlapping a portion of a pixel electrode.

18. The method of claim 14, wherein the first line electrodes on the active matrix substrate are in the same plane as the pixel electrodes and the active material is the ferroelectric material between the side edge of the first electrode and the side edge of pixel electrode.

19. The method of claim 14, wherein the linear relationship is between the reciprocal of electric field $E_F$ and the log of time period $T_S$.

20. A method for driving an active matrix display device having a active matrix substrate with a plurality of pixel electrodes disposed on a first insulating substrate in matrix array and a plurality of first line electrodes arranged in rows with a ferroelectric material as an active material disposed between the first electrodes and each pixel electrode, a second opposed insulating substrate having a plurality of second line electrodes arranged in columns for cooperating with the matrix of pixel electrodes and an electro-optical material disposed in the space between the substrates, comprising the steps of;
applying a data voltage $\pm V_1$ to at least one of the plurality of the first line electrodes; and
applying a selective voltage $\pm V_0$ to at least one of the plurality of the second line electrodes so that the range of absolute value of the data voltage $|V_1|$ is represented by:

$$|V_1| < E_c d_F(C_{LC}+C_F)/C_{LC}$$

in which $E_C$ is a coercive electric field of the ferroelectric material, $d_F$ is the thickness of the ferroelectric material, $C_F$ is the capacitance of the active material at one pixel and $C_{LC}$ is the capacitance of the electro-optical material.

21. The method of claim 20, wherein the electro-optical material is a liquid crystal material and the capacitance of the liquid crystal material is $C_{LC}$.

22. The method of claim 20, wherein the selective voltage $\pm V_0$ is sequentially applied to the plurality of second line electrodes.

23. The method of claim 20, wherein the first line electrodes on the active matrix substrate include a plurality of projections, each projection for overlapping a portion of a pixel electrode.

24. The method of claim 20, wherein the first line electrodes on the active matrix substrate are in the same plane as the pixel electrodes and the active material is the ferroelectric material between the side edge of the first electrode and the side edge of pixel electrode.

25. A method for driving an active matrix display device having a active matrix substrate with a plurality of pixel electrodes disposed on a first insulating substrate in matrix array and a plurality of first line electrodes arranged in rows with a ferroelectric material as an active material disposed between the first electrodes and each pixel electrode, a second opposed insulating substrate having a plurality of second line electrodes arranged in columns for cooperating with the matrix of pixel electrodes and an electro-optical material disposed in the space between the substrates, comprising the steps of;
applying a data voltage $\pm V_1$ to at least one of the plurality of the first line electrodes; and
applying a selective voltage $\pm V_0$ to at least one of the plurality of the second line electrodes so that the range of an absolute value $|V_F|$ of a voltage $V_F$ is represented by:

$$V_F = |V_1| C_{LC}/(C_{LC}+C_F) = E_F d_F$$

in which $C_F$ is the capacitance of the active material at one pixel, $C_{LC}$ is the capacitance of the electro-optical material, $E_F$ is an electric field to be applied to the ferroelectric material, and $d_f$ defines the thickness of the ferroelectric material;
wherein application of voltage $V_F$ to the active material avoids inversion of spontaneous polarization in the active material and wherein a time period $T_S$ for inverting said spontaneous polarization is determined by $E_F$, and wherein $V_F$ is determined so that $T_S$ is longer than a selective period, said selective period representing the period of time during which inversion of the spontaneous polarization in the active material occurs.

26. The method of claim 25, wherein the voltage $V_F$ is applied in the time period greater than the selective period.

27. The method of claim 25, wherein the reciprocal of the electric field $E_F$ and time period $T_S$ form a linear relationship.

28. The method of claim 27, wherein the linear relationship is between the reciprocal of electric field $E_F$ and log of time period $T_S$.

29. The method of claim 25, wherein the selective voltage $\pm V_0$ is sequentially applied to the plurality of second line electrodes.

30. The method of claim 25, wherein the first line electrodes on the active matrix substrate include a plurality of projections, each projection for overlapping a portion of a pixel electrode.

31. The method of claim 25, wherein the first line electrodes on the active matrix substrate are in the same plane as the pixel electrodes and the active material is the ferroelectric material between the side edge of the first electrode and the side edge of the pixel electrode.

32. The method of claim 31, wherein the linear relationship is between the reciprocal of the electric field $E_F$ and the log time period $T_S$.

33. A method for driving an active matrix display device having a active matrix substrate with a plurality of pixel electrodes disposed on a first insulating substrate in matrix array and a plurality of first line electrodes arranged in rows with a ferroelectric material as an active material disposed between the first electrodes and each pixel electrode, a second opposed insulating substrate having a plurality of second line electrodes arranged in columns for cooperating with the matrix of pixel electrodes and an electro-optical material disposed in the space between the substrates, comprising the steps of;
applying a data voltage $\pm V_1$ to at least one of the plurality of the first line electrodes; and
applying a selective voltage $\pm V_0$ to at least one of the plurality of the second line electrodes so that the range of an absolute value $|V_F|$ of a voltage $V_F$ is represented by:

$$V_F = |V_1|C_{LC}/(C_{LC}+C_F) = E_F d_F$$

in which $C_F$ is the capacitance of the active material at one pixel, $C_{LC}$ is the capacitance of the electro-optical material, $E_F$ is an electric field to be applied to the ferroelectric material, and $d_F$ defines the thickness of the ferroelectric material;

wherein when inversion of spontaneous polarization in the active material occurs, the reciprocal of electric field $E_F$ and a time period $T_S$ for inverting spontaneous polarization in the active material ferroelectric layer form a linear relationship.

34. The method of claim 33, wherein the electro-optical material is a liquid crystal material and the capacitance of the liquid crystal material is $C_{LC}$.

35. The method of claim 33, wherein the selective voltage $\pm V_0$ is sequentially applied to the plurality of second line electrodes.

36. The method of claim 33, wherein the first line electrodes on the active matrix substrate include a plurality of projections, each projection for overlapping a portion of a pixel electrode.

37. The method of claim 33, wherein the first line electrodes on the active matrix substrate are in the same plane as the pixel electrodes and the active material is the ferroelectric material between the side edge of the first electrode and the side edge of pixel electrode.

* * * * *